US 6,550,819 B2

(12) United States Patent
DeSanto, Sr.

(10) Patent No.: US 6,550,819 B2
(45) Date of Patent: Apr. 22, 2003

(54) PRESSURE RELIEVING ARCH HAVING SPLIT PIPE SLEEVES

(75) Inventor: Nicholas DeSanto, Sr., Great Meadows, NJ (US)

(73) Assignee: Aero Plumbing & Heating Co., Inc., Great Meadows, NJ (US)

( * ) Notice: Subject to any disclaimer, the term of this patent is extended or adjusted under 35 U.S.C. 154(b) by 0 days.

(21) Appl. No.: 09/766,063

(22) Filed: Jan. 22, 2001

(65) Prior Publication Data

US 2002/0096881 A1 Jul. 25, 2002

(51) Int. Cl.$^7$ ................................................ F16L 41/00
(52) U.S. Cl. ...................... 285/192; 52/220.8; 285/419; 285/64
(58) Field of Search .......................... 285/47, 189, 192, 285/215, 216, 217, 64, 419, 373; 52/220.8, 232–405.3

(56) References Cited

U.S. PATENT DOCUMENTS

| 4,550,927 A | * | 11/1985 | Resele ........................... 285/419 |
| 4,630,415 A | * | 12/1986 | Attwell ........................ 285/189 |
| 4,716,926 A | * | 1/1988 | Jacobs ............................. 285/47 |
| 4,870,856 A | * | 10/1989 | Sharp ............................ 285/373 |
| 5,755,345 A | * | 5/1998 | Valyi ............................... 138/89 |
| 6,247,500 B1 | * | 6/2001 | McMahon ..................... 285/373 |

* cited by examiner

*Primary Examiner*—Lynne Browne
*Assistant Examiner*—Aaron Dunwoody
(74) *Attorney, Agent, or Firm*—Ezra Sutton

(57) ABSTRACT

A protective sleeve in the form of a pressure relieving arch having a pair of split pipe sleeves for surrounding an uncut pipe or an uncut piping system preventing breakage by relieving structural strain from loads of a wall, footing or foundation around the pipe or piping system being protected. The pressure relieving arch includes a first protective pipe sleeve in the shape of a hollow semi-circle having a first pair of mating edges; and a second protective pipe sleeve in the shape of a hollow semi-circle having a second pair of mating edges. The first pair of mating edges of the first protective pipe sleeve for mating and connecting with the second pair of mating edges of the second protective pipe sleeve for forming a hollow and cylindrically-shaped pressure relieving arch. The pressure relieving arch is used for surrounding an uncut individual pipe or a plurality of uncut pipes within a piping system for preventing pipe breakage by relieving and preventing structural strain from loads of walls, footings, foundations or ground around the pipe or piping system.

12 Claims, 6 Drawing Sheets

PRESSURE RELIEVING ARCH HAVING SPLIT PIPE SLEEVES

FIELD OF THE INVENTION

The present invention relates to a pair of split pipe sleeves used as a pressure relieving arch for protecting pipes or piping systems passing under or through walls or footings from breakage. More particularly, the pressure relieving arch has a pair of protective split pipe sleeves which surrounds a pipe or piping system for preventing structural strain from being transmitted from any wall or footing to the pipe or piping system being protected.

BACKGROUND OF THE INVENTION

Presently, all relieving arches or pipe protective sleeves are made of a unitary construction (a single piece) from either cast iron or steel materials. Situations occur when a pipe or piping system is installed through a concrete wall or under a concrete footing without the use of a protective relieving arch. Also, foundations and other building alterations are added over a pipe or piping system at a later time. These pipe protective sleeves must be installed in the above mentioned situations by cutting the pipe or the plurality of pipes of the piping system and then slipping the pipe protective sleeve over the pipes in order to provide the proper structural support to those walls or foundations without breaking the pipes. The pipes in the piping system are repaired thereafter and connected together again, after the pipe protective sleeves are installed.

There remains a need for a pressure relieving arch having a pair of split pipe sleeves thereof for protecting pipes or piping systems from breakage which pass under or through walls or footings or foundations without having to cut the aforementioned pipes or piping systems. Further, this pressure relieving arch in having each of the protective split pipe sleeves surround the uncut pipe or uncut piping system prevents any structural strain to be transmitted from any wall or foundation to that pipe or an uncut piping system being protected.

DESCRIPTION OF THE PRIOR ART

Pipe support devices, pipe coupling devices, tube coupling devices, pipe sleeves, pipe-supporting clamp devices and relieving arches of various designs, configurations, structures and materials of construction have been disclosed in the prior art. For example, U.S. Pat. Nos. 4,313,286 and 4,453,354 to Harbeke discloses a pipe support and coupling device. This device is adapted to be permanently embedded in the masonry floor of a building structure for both supporting and joining pipe sections extending above and below the floor. The device has anchor means formed integrally with the outer tubular sleeve portion which are surrounded by the masonry material to prevent movement of same relative to the floor. The ends of the device are of several different designs to permit the joining thereto of pipe ends by various methods. This prior art patent does not disclose or teach the particular structure and method of the present invention for a relieving arch having split pipe sleeves for protecting an uncut pipe or an uncut piping system from breakage.

U.S. Pat. No. 4,488,388 to Schmidt discloses a pipe-supporting clamp device that is adapted to be permanently embedded in the masonry floor of a building structure for supporting a pipe extending through the center of the clamp device. The device has an anchor flange formed therewith which are surrounded by the masonry material to prevent movement of the device in the floor. A pipe sleeve is also provided adjacent to one end of the device for forcing a portion of the interior wall of the device into engagement substantially all around the circumference of a portion of the pipe sleeve to clamp the pipe against movement within the supporting pipe clamp device. This prior art patent does not disclose or teach the particular structure and method of the present invention for a relieving arch having split pipe sleeves for protecting an uncut pipe or an uncut piping system from breakage.

U.S. Pat. No. 5,090,739 to Pollard discloses a plumbing sleeve. The plumbing sleeve is used as a pipe coupling device for joining together drainage or other plastic piping through a poured concrete layer of a floor. The plumbing sleeve permits precise location of fittings, such as a toilet flange after the concrete has been poured and set. The sleeve includes a narrower first tube, an intermediate radial flange, and a wider second tube. This prior art patent does not disclose or teach the particular structure and method of the present invention for a relieving arch having split pipe sleeves for protecting an uncut pipe or an uncut piping system from breakage.

U.S. Pat. No. 5,332,267 to Harrison discloses a tube coupling. The tube coupling includes a male member-having a spherical surface that produces a ball-joint effect between the male fitting and tube to render the connection insensitive to alignment with a chosen design range. This prior art patent does not disclose or teach the particular structure and method of the present invention for a relieving arch having split pipe sleeves for protecting an uncut pipe or an uncut piping system from breakage.

None of the aforementioned prior art patents disclose or teach the structures and configurations of the present invention of a relieving arch having a pair of protective split pipe sleeves surrounding an uncut pipe or an uncut piping system for preventing any structural strain from being transmitted from any wall or footing or foundation to the uncut pipe or an uncut piping system that is being protected.

Accordingly, it is an object of the present invention to provide a relieving arch having split pipe sleeves for protecting and surrounding individual uncut pipes and/or uncut piping systems passing under or through walls or footings from breakage due to structural strain caused by ground movement.

Another object of the present invention is to provide protective split pipe sleeves that permit the relief of structural strain for a plurality of arch supports and protects the piping from super imposed loads of walls or footings or foundations for a particular building structure (i.e. home, commercial building, industrial plant or high rise structure).

Another object of the present invention is to provide protective split pipe sleeves that are sized such that there is a minimum of ½ inch clearance around the pipe or piping system it protects and/or the insulation and packing around the pipe or piping system it protects.

Another object of the present invention is to provide protective split pipe sleeves for use as a relieving arch having various configurations and designs for easy assembly and use by the builder.

Another object of the present invention is to provide protective split pipe sleeves that are made from cast iron, steel, stainless steel, or made from durable, hard plastics.

Another object of the present invention is to provide a relieving arch having protective split pipe sleeves therein made from durable materials being designed such that it gives satisfactory service as provided by National Standard Plumbing Code or by the local building codes and/or ordinances for an expanded and reasonable expected life of the installed relieving arch.

A further object of the present invention is to provide protective split pipe sleeves to use as a relieving arch that can be mass produced in an automated and economical manner and is readily affordable to the builder.

SUMMARY OF THE INVENTION

In accordance with the present invention, there is provided a protective sleeve in the form of a pressure relieving arch having a pair of split pipe sleeves for surrounding an uncut pipe or an uncut piping system for preventing breakage by relieving structural strain from loads of a wall, footing or foundation around the pipe or piping system being protected. The pressure relieving arch includes a first protective pipe sleeve in the shape of a hollow semi-circle having a first pair of mating edges; and a second protective pipe sleeve in the shape of a hollow semi-circle having a second pair of mating edges. The first pair of mating edges of the first protective pipe sleeve for mating and connecting with the second pair of mating edges of the second protective pipe sleeve for forming a hollow and cylindrically-shaped pressure relieving arch. The pressure relieving arch is used for surrounding an uncut individual pipe or a plurality of uncut pipes within a piping system for preventing pipe breakage by relieving and preventing structural strain from loads of walls, footings, foundations or ground around the pipe or piping system.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT AND ALTERNATE EMBODIMENTS

Overview

Figure 1:
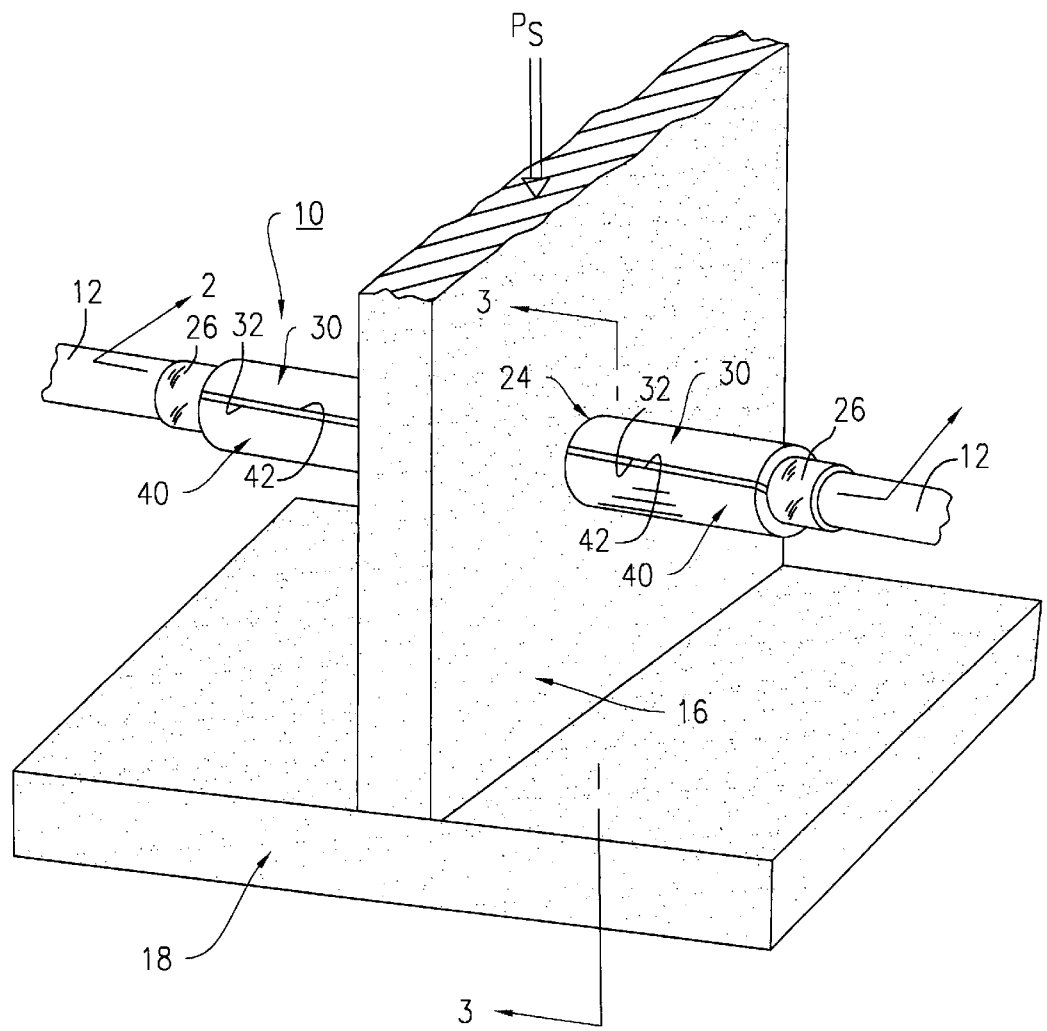
FIG. 1 is a front perspective view of the pressure relieving arch of the preferred embodiment of the present invention showing the first and second split pipe sleeve members of the pressure relieving arch surrounding the insulation and packing materials of an individual pipe that is passing through a concrete wall and being in operational use thereof.
Figure 1A:
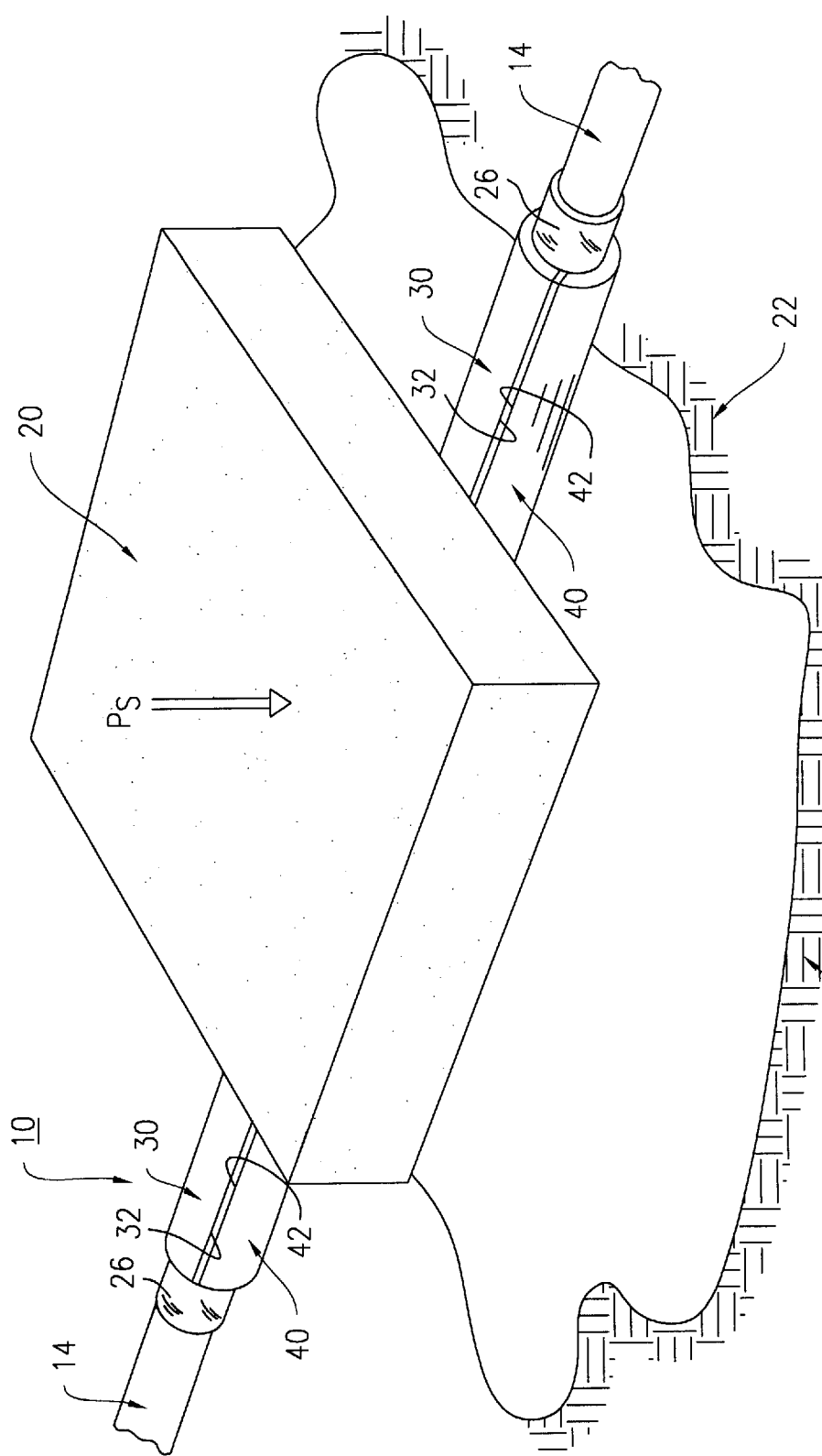
FIG. 1A is a front perspective view of the pressure relieving arch of the preferred embodiment of the present invention showing the first and second split pipe sleeve members of the pressure relieving arch surrounding the insulation materials of a piping system that is passing under a concrete foundation in the ground and being in operational use thereof.

The pressure relieving arch 10, 100, 200, 300, 400, 500 and 600 and its component parts of the preferred and alternate embodiments of the present invention are represented in detail by FIGS. 1 through 17 of the patent drawings. The pressure relieving arch 10, 100, 200, 300, 400, 500 and 600 are used for protecting uncut pipes 12 or uncut piping systems 14 passing under or through walls 16, footings 18 or foundations 20 from breakage without having to cut the above mentioned pipes 12 or piping systems 20, as depicted in FIGS. 1 and 1A of the drawings. Each of the pressure relieving arches 10, 100, 200, 300, 400, 500 and 600 includes a pair of protective split pipe sleeves 30 and 40; 130 and 140; 230 and 240; 330 and 340; 430 and 440; 530 and 540; and 630 and 650, respectively, which surrounds the uncut pipe 12 or uncut piping system 14 in order to prevent any structural strain ($P_s$) to be transmitted from any walls 16, footings 18 or foundations 20 to that pipe 12 or piping system 14 being protected. The protective split pipe sleeves 30 and 40; 130 and 140; 230 and 240; 330 and 340; 430 and 440; 530 and 540; and 630 and 650, respectively can be made from metal piping such as cast iron, steel or stainless steel; or made from durable and hard plastic piping. When in operational use, each of the relieving arches 10, 100, 200, 300, 400, 500 and 600 shall be sized so there is a minimum of an ½ inch clearance area space 28 around the pipe 12 or piping system 14 and/or the insulation/packing materials 26. The packing material 26 around the pipe 12 or piping system 14 is flexible enough to respond to any settling in the building structure or piping 12 and 14.

Preferred Embodiment

Figure 2:
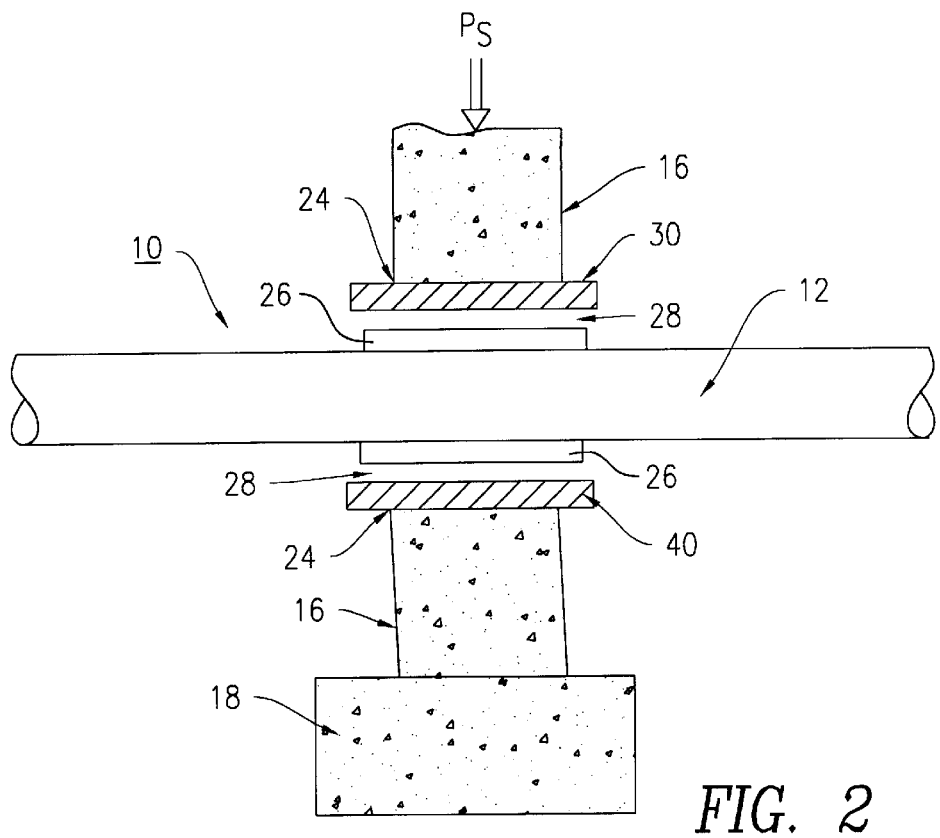
FIG. 2 is a cross-sectional view of the pressure relieving arch of the preferred embodiment of the present invention taken along lines 2—2 of FIG. 1 showing the split pipe sleeve passing through a concrete wall, and a clearance area space around the insulation and packing material of the individual pipe.
Figure 3:
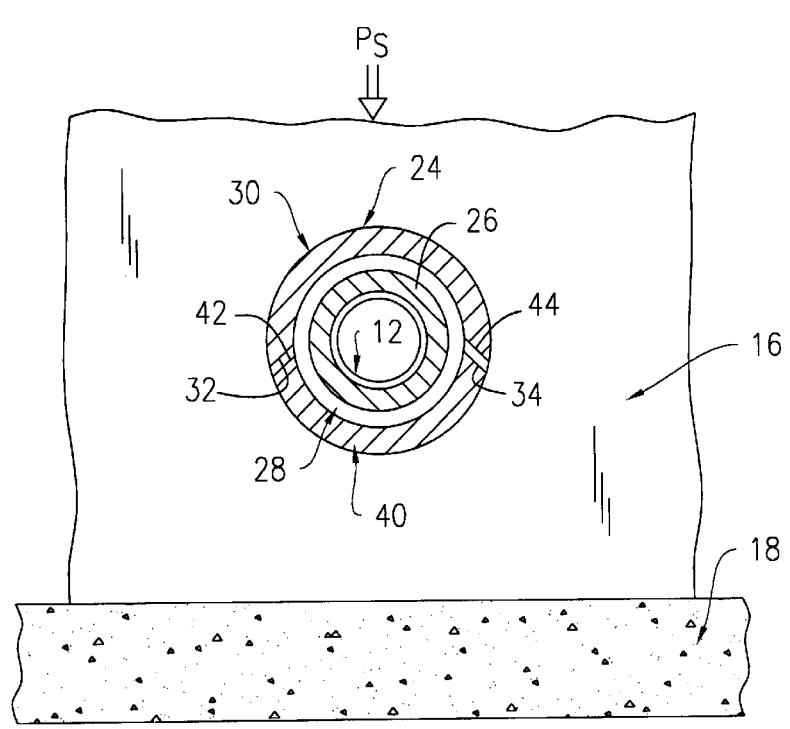
FIG. 3 is a cross-sectional view of the pressure relieving arch of the preferred embodiment of the present invention taken along lines 3—3 of FIG. 1 showing the first and second split pipe sleeves passing through a concrete wall, and a clearance area space surrounding the insulation and packing material of the individual pipe.
Figure 4:
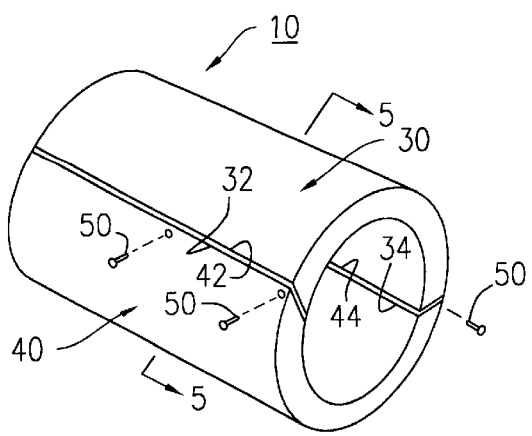
FIG. 4 is a front perspective view of the pressure relieving arch of the preferred embodiment of the present invention showing the first and second split pipe sleeves each having a pair of angled mating edges thereon.
Figure 5:
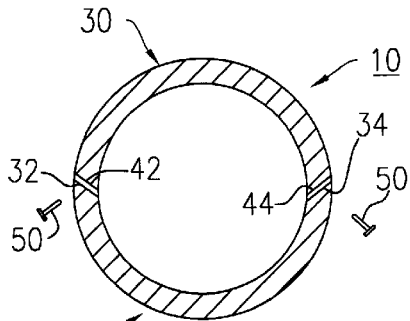
FIG. 5 is a cross-sectional view of the pressure relieving arch of the preferred embodiment of the present invention taken along lines 5—5 of FIG. 4 showing the first pair of angled mating edges of the first split pipe sleeve for connecting and joining with the second pair of angled mating edges of the second split pipe sleeve thereto.

The pressure relieving arch 10 of the preferred embodiment of the present invention is represented in detail by FIGS. 1, 1A through 5 of the patent drawings. Each of the first and second protective split pipe sleeves 30 and 40 of pressure relieving arch 10 is substantially U-shaped, as shown in FIGS. 1, 4 and 5 of the drawings. The first split pipe sleeve 30 includes a first pair of angled mating edges 32 and 34, and the second split pipe sleeve 40 includes a second pair of angled mating edges 42 and 44, respectively, as shown in FIG. 5 of the drawings. Each of the angled mating edges 32, 34, 42 and 44 have an angle cut of 45° degrees. The first pair of angled mating edges 32 and 34 are matched and joined with the second pair of angled mating edges 42 and 44, of the first and second split pipe sleeves 30 and 40, respectively, to form the pressure relieving arch 10 of the present invention, as shown in FIGS. 1, 1A and 4 of the drawings.

First Alternate Embodiment 100

Figure 6:
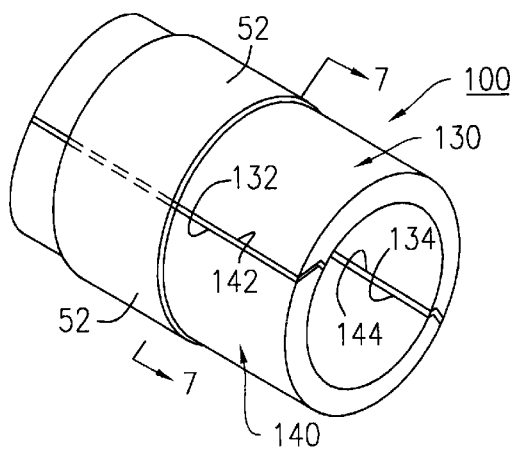
FIG. 6 is a front perspective view of the pressure relieving arch of the first alternate embodiment of the present invention showing the first and second split pipe sleeves each having a pair of partially angled mating edges thereon.
Figure 7:
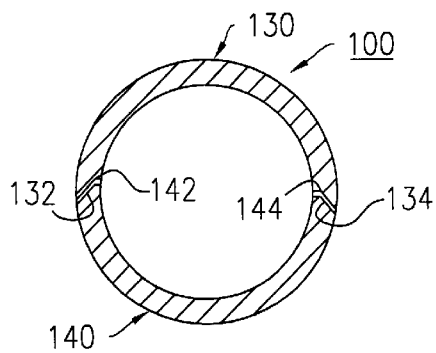
FIG. 7 is a cross-sectional view of the pressure relieving arch of the first alternate embodiment of the present invention taken along lines 7—7 of FIG. 6 showing the first pair of partially angled mating edges of the first split pipe sleeve for connecting and joining with the second pair of partially angled mating edges of the second split pipe sleeve thereto.

The pressure relieving arch 100 of the first alternate embodiment of the present invention is represented in detail by FIGS. 6 and 7 of the patent drawings. Each of the first and second protective split pipes sleeves 130 and 140 of pressure relieving arch 100 is substantially U-shaped. The first split pipe sleeve 130 includes a first pair of partially angled mating edges 132 and 134, and the second split pipe sleeve 140 includes a second pair of partially angled mating edges 142 and 144, as shown in FIG. 7 of the drawings. Each of the partially angled mating edges 132, 134, 142 and 144 includes a straight edge and an angled cut of 45° degrees. The first pair of partially angled mating edges 132 and 134 are matched and joined with the second pair of partially angled mating edges 142 and 144, of the first and second split pipe sleeves 130 and 140, respectively, to form the pressure relieving arch 100 of the present invention, as shown in FIG. 6 of the drawings.

Second Alternate Embodiment 200

Figure 8:
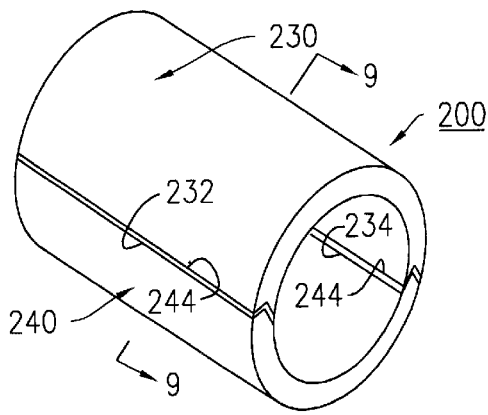
FIG. 8 is a front perspective view of the pressure relieving arch of the second alternate embodiment of the present invention showing the first and second split pipe sleeves each having a pair of inverted V-shaped notched mating edges thereon.
Figure 9:
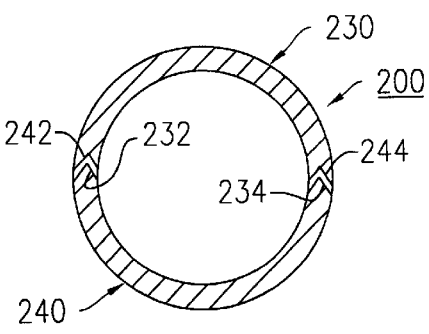
FIG. 9 is a cross-sectional view of the pressure relieving arch of the second alternate embodiment of the present invention taken along lines 9—9 of FIG. 8 showing the first pair of inverted V-shaped notched mating edges of the first split pipe sleeve for connecting and joining with the second pair of inverted V-shaped notched mating edges of the second split pipe sleeve thereto.

The pressure relieving arch 200 of the second alternate embodiment of the present invention is represented in detail by FIGS. 8 and 9 of the patent drawings. Each of the first and second protective split pipes sleeves 230 and 240 of pressure relieving arch 200 is substantially U-shaped. The first split pipe sleeve 230 includes a first pair of inverted V-shaped notched mating edges 232 and 234, and the second split pipe sleeve 240 includes a second pair of partially angled mating edges 242 and 244, as shown in FIG. 9 of the drawings. Each of the inverted V-shaped notched and male mating edges 232, 234, 242 and 244, respectively, have a substantially isosceles triangular-shaped configuration. The first pair of inverted V-shaped notched mating edges 232 and 234 are matched and joined with the second pair of inverted V-shaped male mating edges 242 and 244, of the first and second split pipe sleeves 230 and 240, respectively, to form the pressure relieving arch 200 of the present invention, as shown in FIG. 8 of the drawings.

Third Alternate Embodiment 300

Figure 10:
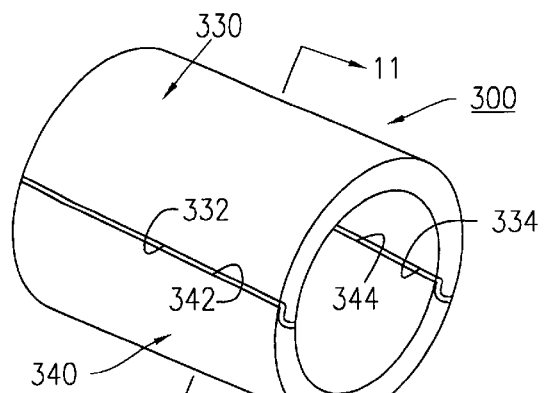
FIG. 10 is a front perspective-view of the pressure relieving arch of the third alternate embodiment of the present invention showing the first and second split pipe sleeves each having a pair of S-shaped grooved mating edges thereon.
Figure 11:
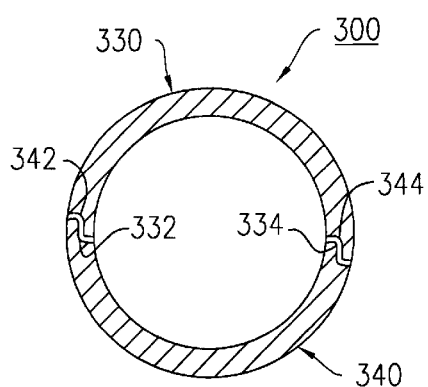
FIG. 11 is a cross-sectional view of the pressure relieving arch of the third alternate embodiment of the present invention taken along lines 11—11 of FIG. 10 showing the first pair of S-shaped grooved mating edges of the first split pipe sleeve for connecting and joining with the second pair of S-shaped grooved mating edges of the second split pipe sleeve thereto.

The pressure relieving arch 300 of the third alternate embodiment of the present invention is represented in detail by FIGS. 10 and 11 of the patent drawings. Each of the first and second protective split pipes sleeves 330 and 340 of pressure relieving arch 300 is substantially U-shaped. The first split pipe sleeve 330 includes a first pair of S-shaped grooved mating edges 332 and 334, and the second split pipe sleeve 340 includes a second pair of S-shaped grooved mating edges 342 and 344, as shown in FIG. 11 of the drawings. Each of the S-shaped grooved mating edges 332, 334, 342 and 344 are interlocking curved sections. The first pair of S-shaped grooved mating edges 332 and 334 are matched and joined with the second pair of S-shaped grooved mating edges 342 and 344, of the first and second split pipe sleeves 330 and 340, respectively, to form the pressure relieving arch 300 of the present invention, as shown in FIG. 10 of the drawings.

Fourth Alternate Embodiment 400

Figure 12:
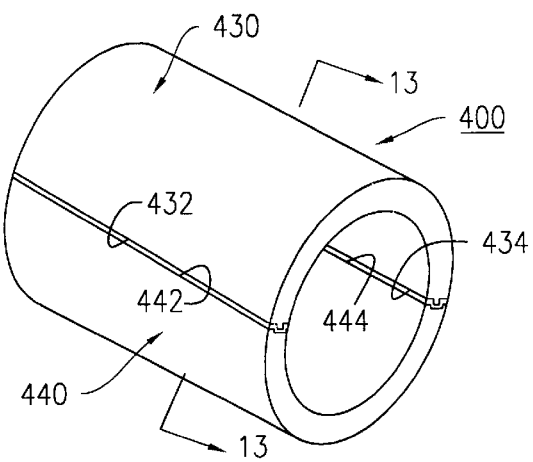
FIG. 12 is a front perspective view of the pressure relieving arch of the fourth alternate embodiment of the present invention showing the first and second split pipe sleeves each having a pair of T-shaped notched mating edges thereon.
Figure 13:
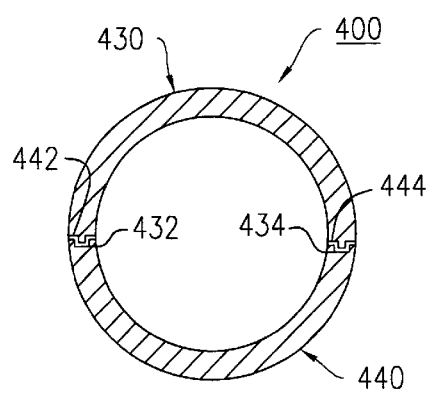
FIG. 13 is a cross-sectional view of the pressure relieving arch of the fourth alternate embodiment of the present invention taken along lines 13—13 of FIG. 12 showing the first pair of T-shaped notched mating edges of the first split pipe sleeve for connecting and joining with the second pair of T-shaped notched mating edges of the second split pipe sleeve thereto.

The pressure relieving arch 400 of the fourth alternate embodiment of the present invention is represented in detail by FIGS. 12 and 13 of the patent drawings. Each of the first and second protective split pipes sleeves 430 and 440 of pressure relieving arch 400 is substantially U-shaped. The first split pipe sleeve 430 includes a first pair of T-shaped male tab mating edges 432 and 434, and the second split pipe sleeve 440 includes a second pair of T-shaped notched mating edges 442 and 444, as shown in FIG. 13 of the drawings. Each of the T-shaped male tab and notched mating edges 432, 434, 442 and 444, respectively, have a substantially rectangular shaped configuration. The first pair of T-shaped male tab mating edges 432 and 434 are matched and joined with the second pair of T-shaped notched mating edges 442 and 444, of the first and second split pipe sleeves 430 and 440, respectively, to form the pressure relieving arch 400 of the present invention, as shown in FIG. 12 of the drawings.

Fifth Alternate Embodiment 500

Figure 14:
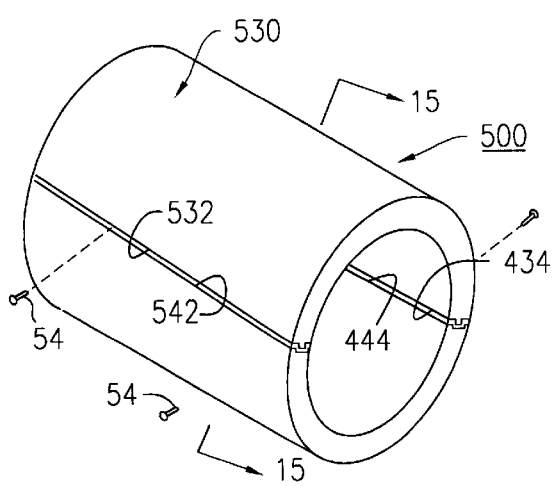
FIG. 14 is a front perspective view of the pressure relieving arch of the fifth alternate embodiment of the present invention showing the first and second split pipe sleeves each having a pair of L-shaped lap joint mating edges thereon.
Figure 15:
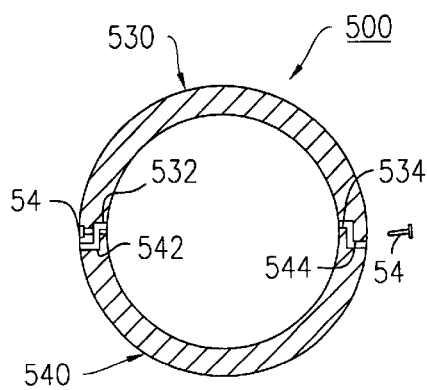
FIG. 15 is a cross-sectional view of the pressure relieving arch of the fifth alternate embodiment of the present invention take along lines 15—15 of FIG. 14 showing the first pair of L-shaped lap joint mating edges of the first split pipe sleeve for connecting and joining with the second pair of L-shaped lap joint mating edges of the second split pipe sleeve thereto.

The pressure relieving arch 500 of the fifth alternate embodiment of the present invention is represented in detail by FIGS. 14 and 15 of the patent drawings. Each of the first and second protective split pipe sleeves 530 and 540 of pressure relieving arch 500 in substantially U-shaped. The first split pipe sleeve 530 includes a first pair L-shaped lap joint mating edges 532 and 534 and the second split pipe sleeve 540 includes a second pair of L-shaped lap joint mating edges 542 and 544, as shown in FIG. 15 of the drawings. Each of the L-shaped lap joint mating edges 532, 534, 542 and 544, respectively, having a substantially rectangular shaped configuration. The first pair of L-shaped lap joint mating edges 532 and 534 are matched and joined with the second pair of L-shaped lap joint mating edges 542 and 544, of the first and second split pipe sleeves 530 and 540, respectively, to form the pressure relieving arch 500 of the present invention, as shown in FIG. 14 of the drawings.

Sixth Alternate Embodiment 600

Figure 16:
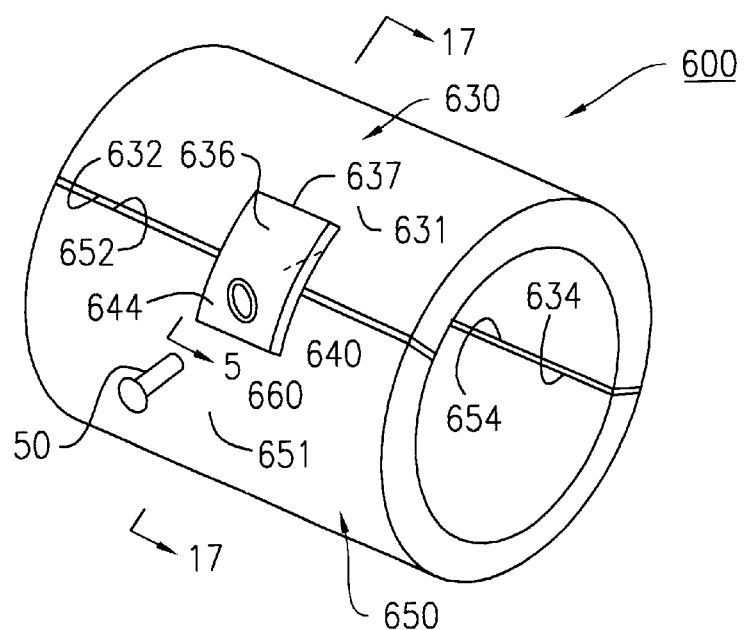
FIG. 16 is a front perspective view of the pressure relieving arch of the sixth alternate Embodiment of the present invention showing the first and second split pipe sleeves each having a pair of radial mating edges thereon, and the first split pipe sleeve having a pair of hinged members attached thereto.
Figure 17:
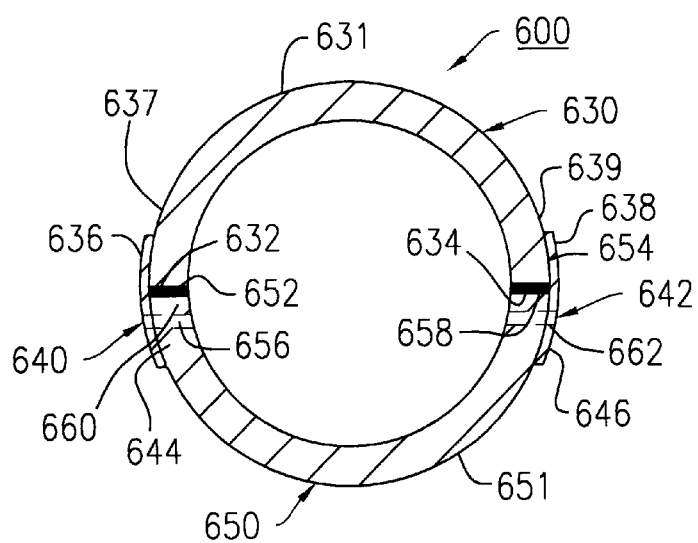
FIG. 17 is a cross-sectional view of the pressure relieving arch of the sixth alternate embodiment of the present invention taken along lines 17—17 of FIG. 16 showing the pair of hinged members and the first pair of radial mating edges of the first split pipe sleeve for connecting and attaching to side walls of the second split pipe sleeve, as well as for connecting and joining with the second pair of radial mating edges of the second split pipe sleeve thereto.

The pressuring relieving arch 600 of the sixth alternate embodiment of the present invention is represented in detail by FIGS. 16 and 17 of the patent drawings. Each of the first and second protective split pipe sleeves 630 and 650 of pressure relieving arch 600 is substantially U-shaped. The first split pipe sleeve 630 includes a first pair of straight (radial) mating edges 632 and 634 and a pair of opposing curved hinge members 636 and 638 being connected at location areas 637 and 639, respectively, on the wall section 631 of the first split pipe sleeve 630. Each of the curved hinge members 636 and 638 includes hinge attachment openings 640 and 642 for receiving screws 50 therein. Hinge attachment opening 640 and 642 are centrally located at the lower ends 644 and 646 of each hinge member 636 and 638, respectively, as shown in FIG. 17 of the drawings. The second split pipe sleeve 650 includes a second pair of straight (radial) mating edges 652 and 654; and a pair connecting openings 656 and 658. Connecting openings 656 and 658 are opposed to each other and are located at point locations 660 and 662 of wall section 651 of the second split pipe sleeve 650 for receiving screws 50 therein. When each of the first and second split pipe sleeves 630 and 650 are aligned with each other via the first and second pairs of straight mating edges 632, 634, 652 and 654, respectively, each hinge attachment opening 640 and 641 of curved hinge members 636 and 638 are adjacent and in alignment with connecting openings 656 and 658, respectively, in order to receive a pair of connecting of curved hinge members 636 and 638 of the first split pipe sleeve 630 to that of the second split pipe sleeve 650, respectively, form the pressure relieving arch 600 of the present invention, as shown in FIG. 16 of the drawings.

Operation of the Present Invention

In operation, all of the pressure relieving arches 10, 100, 200, 300, 400, 500 and 600 of the preferred and alternate embodiments, as shown in FIGS. 1, 1A, 4, 6, 8, 10, 12, 14 and 16 of the patent drawings, operate in a similar fashion, with the exception of alternate embodiment 600 operating in a somewhat different fashion. As shown in FIGS. 1 and 1A, the builder simply slips the first and second split pipe sleeves 30 and 40 around pipe 12 or piping system 14 and through wall opening 24 of concrete wall 16 or under the ground 22 below foundation 20, such that the first pair of angled mating edges 32 and 34 of the first split pipe sleeve 30 is aligned and matched with that of the second pair of angled mating edges 42 and 44 of the second split pipe sleeve 40, respectively. Once the split pipe sleeves 30 and 40 are joined, reset screws 50 can be drilled and tapped every 8 inches or so, as shown in FIG. 4, first to temporarily hold the split pipe sleeves 30 and 40 in place, and until additional concrete or footings are poured around the formed relieving arch 10. Other methods for temporarily holding the two pipe sleeve halves together include adhesive duct tape 52 or rivets 54, as shown in FIGS. 6 and 14 of the drawings. The pressure relieving arches 10, 100, 200, 300,400 and 500 are all sized such there is a minimum of an ½ inch clearance area space 28 surrounding the pipe 12 or piping system 14, as shown in FIGS. 2 and 3 of the drawings. Packing and/or insulation material 26 surrounds the pipe 12 or piping system 14 as a response to any settling in the building structure or on the piping 12 or 14.

In using the sixth alternate embodiment 600 of the present invention, the builder simply connects the first and second split pipe sleeves 530 and 550 via the pair of opposing curved hinge members 536 and 538, thus eliminating the use of reset screws 50 for holding the first and second protective split pipe sleeves together, as previously mentioned.

Advantages of the Present Invention

Accordingly, an advantage of the present invention is that it provides for a relieving arch having split pipe sleeves for protecting and surrounding individual uncut pipes and/or uncut piping systems passing under or through walls or footings from breakage due to structural strain caused by ground movement.

Another advantage of the present invention is that it provides for protective split pipe sleeves that permit the relief of structural strain for a plurality of arch supports and protects the piping from super imposed loads of walls or footings or foundations for a particular building structure (i.e. home, commercial building, industrial plant or high rise structure).

Another advantage of the present invention is that it provides for protective split pipe sleeves that are sized such that there is a minimum of ½ inch clearance around the pipe or piping system it protects and/or the insulation and packing around the pipe or piping system it protects.

Another advantage of the present invention is that it provides for a protective split pipe sleeves for use as a relieving arch having various configurations and designs for easy assembly and use by the builder.

Another advantage of the present invention is that it provides for protective split pipe sleeves that are made from cast iron, steel, stainless steel, or made from durable, hard plastics.

Another advantage of the present invention is that it provides for a relieving arch having protective split pipe sleeves therein made from durable materials being Plumbing Code or by the local building codes and/or ordinances for an expanded and reasonable expected life of the installed relieving arch.

A further advantage of the present invention is that it provides for a protective split pipe sleeves to use as a relieving arch that can be mass produced in an automated and economical manner and is readily affordable to the builder.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A protective sleeve in the form of a pressure relieving arch having a pair of split pipe sleeves for surrounding an uncut pipe or an uncut piping system for preventing breakage by relieving structural stain from loads of a wall, footing or foundation around the pipe or piping system being protected, comprising:
    a) a first protective pipe sleeve in the shape of a hollow semi-circle having a first pair of mating edges;
    b) a second protective pipe sleeve in the shape of a hollow semi-circle having a second pair of mating edges;
    c) said first pair of mating edges of said first protective pipe sleeve for mating with said second pair of mating edges of said second protective pipe sleeve for forming a hollow and cylindrically-shaped pressure relieving arch;
    d) means for preventing said first and second pairs of mating edges from moving relative to each other are positioned along the length of said pairs of mating edges at predetermined intervals; and
    e) said pressure relieving arch for surrounding an uncut individual pipe or a plurality of uncut pipes within a piping system for preventing pipe breakage by relieving and preventing structural strain from loads of walls, footings, foundations or ground around the pipe or piping system.

2. A pressure relieving arch in accordance with claim 1, wherein said means for preventing movement includes rivets, screws, adhesive tape, duct tape, hinge members or other fastening means.

3. A pressure relieving arch in accordance with claim 1, wherein said pressure relieving arch includes a spaced-apart clearance from an insulation and packing layer on the pipe or piping system; or from the pipe or piping system.

4. A pressure relieving arch in accordance with claim 3, wherein said spaced-apart clearance is at least ½ inch from said insulation and packing layer on the pipe or piping system, or is at least ½ inch from the pipe or piping system.

5. A pressure relieving arch in accordance with claim 1, wherein said first and second pairs of mating edges are configured to include 45° degree angled edges for mating with each other to form said protective sleeve.

6. A pressure relieving arch in accordance with claim 1, wherein said first and second pairs of mating edges are configured to include partial straight edges and 45° degree angled edges for mating with each other to form said protective sleeve.

7. A pressure relieving arch in accordance with claim 1, wherein said first and second pairs of mating edges are configured to include inverted V-shaped notched edges for mating with each other to form said protective sleeve.

8. A pressure relieving arch in accordance with claim 1, wherein said first and second pairs of mating edges are configured to include S-shaped grooved edges for mating with each other to form said protective sleeve.

9. A pressure relieving arch in accordance with claim 1, wherein said first and second pairs of mating edges are configured to include T-shaped tongue and groove edges for mating with each other to form said protective sleeve.

10. A pressure relieving arch in accordance with claim 1, wherein said first and second pairs of mating edges are configured to include L-shaped lap joint edges for mating with each other to form said protective sleeve.

11. A pressure relieving arch in accordance with claim 1, wherein said first and second pairs of mating edges are configured to include straight edges for mating with each other to form said protective sleeve.

12. A pressure relieving arch in accordance with claim 1, wherein said first and second protective sleeves are made from cast iron, steel, stainless steel, or durable hard plastics.

* * * * *